US007680094B2

(12) United States Patent
Liu (10) Patent No.: US 7,680,094 B2
(45) Date of Patent: Mar. 16, 2010

(54) METHOD OF ALIGNING PHYSICAL CHANNELS FOR UPLINK TRANSMISSION

(75) Inventor: Jung-Tao Liu, Madison, NJ (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 1304 days.

(21) Appl. No.: 10/671,638

(22) Filed: Sep. 29, 2003

(65) Prior Publication Data
US 2005/0068990 A1    Mar. 31, 2005

(51) Int. Cl.
*H04J 3/06* (2006.01)
(52) U.S. Cl. .......................... 370/350; 370/503
(58) Field of Classification Search ............... 370/335, 370/342, 350, 479, 503–524, 324; 375/365, 375/367, 371
See application file for complete search history.

(56) References Cited

U.S. PATENT DOCUMENTS

| | | | |
|---|---|---|---|
| 6,434,375 B1 * | 8/2002 | Chulajata et al. | 455/276.1 |
| 7,120,132 B2 * | 10/2006 | Choi et al. | 370/324 |
| 2002/0150065 A1 * | 10/2002 | Ponnekanti | 370/334 |
| 2003/0002470 A1 * | 1/2003 | Park et al. | 370/342 |
| 2003/0210668 A1 * | 11/2003 | Malladi et al. | 370/335 |
| 2004/0085936 A1 * | 5/2004 | Gopalakrishnan et al. | 370/335 |
| 2006/0141953 A1 * | 6/2006 | Willenegger | 455/102 |

OTHER PUBLICATIONS

"3$^{rd}$ Generation Partnership Project; Technical Specification Group Radio Access Network; Physical channels and mapping of transport channels onto physical channels (FDD) Release 5", 3GPP TS 25.211 V5.3.0 (Dec. 2002), 1-51.
"3$^{rd}$ Generation Partnership Project; Technical Specification Group Radio Access Network; Spreading and modulation (FDD) Release 5", 3GPP TS 25.213 V5.3.0 (Mar. 2003), 1-28.
"3$^{rd}$ Generation Partnership Project; Technical Specification Group Radio Access Network; Physical layer procedures (FDD) Release 5", 3GPP TS 25.214 V5.5.0 (Jun. 2003), 1-63.

* cited by examiner

*Primary Examiner*—Ricky Ngo
*Assistant Examiner*—Pao Sinkantarakorn
(74) *Attorney, Agent, or Firm*—Harness, Dickey & Pierce (57) ABSTRACT

In a method for aligning a plurality of physical channels for uplink transmission two or more physical channels may be aligned based on a timing offset so that the two channels are transmitted in the uplink at a time instant different than a time of uplink transmission for a third physical channel. Accordingly, the two physical channels may be code multiplexed with additional physical channels other than the third physical channel to generate a code-multiplexed signal to be used for uplink transmission. The timing offset information may be assigned to the user from a base station, for example, in order to align the two physical channels. Accordingly, an increase in peak-to-average power ratio my be avoided and/or reduced if multiplexing the two physical channels with other physical channels for uplink transmission.

12 Claims, 6 Drawing Sheets

METHOD OF ALIGNING PHYSICAL CHANNELS FOR UPLINK TRANSMISSION

RELATED APPLICATIONS

This application is related to the following co-pending U.S. patent applications: U.S. application Ser. No. 10/647,339 to Jung-Tao LIU, filed Aug. 26, 2003 and entitled "Method and Control Channel for Uplink Signaling in a Communication System"; and U.S. application Ser. No. 10/671,672 to Jung-Tao LIU, filed Sep. 29, 2003 and entitled "Multiplexing of Physical Channels on the Uplink". The contents of each of the above co-pending applications are incorporated by reference in their entirety herein.

BACKGROUND OF THE INVENTION

1. Field of the Invention

The present invention relates to telecommunications, and more particularly, wireless communications.

2. Description of Related Art

Expanded efforts are underway to support the evolution of the Universal Mobile Telecommunications System (UMTS) standard, which describes a network infrastructure implementing a next generation Wideband Code Division Multiple Access (W-CDMA) air interface technology. A UMTS typically includes a radio access network, referred to as a UMTS terrestrial radio access network (UTRAN). The UTRAN may interface with a variety of separate core networks (CN). The core networks in turn may communicate with other external networks (ISDN/PSDN, etc.) to pass information to and from a plurality of wireless users, or user equipments (UEs), that are served by radio network controllers (RNCs) and base transceiver stations (BTSs, also referred to as Node Bs), within the UTRAN, for example.

Standardizing bodies such as the 3rd Generation Partnership Project (3GPP and 3GPP2), a body which drafts technical specifications for the UMTS standard and other cellular technologies, have introduced several advanced technologies and enhancements in an effort to ensure that any associated control information is carried in an efficient manner. Certain advanced or enabling technologies may include fast scheduling, Adaptive Modulation and Coding (AMC) and Hybrid Automatic Repeat Request (HARQ) technologies. These technologies have been introduced in an effort to improve overall system capacity.

While much of the standardization to date has focused on the downlink (forward link from Node B/base station to UE/mobile station), similar enhancements are now being considered for the uplink (reverse link) to provide services such as High Speed Downlink Packet Access (HSDPA) services. Further evolution of 3G standards include the development of enhanced uplink (EU) features, which may be referred to as enhanced uplink dedicated channel (EU-DCH) services, to support high-speed reverse link packet access (uplink from mobile station to base station). Many of the techniques used in the forward link (i.e., fast scheduling, AMC, HARQ, etc.) thus may also be usable on the reverse link, so as to improve data rates, improve system capacity, and reduce system costs, for example.

A physical channel is an entity used to carry information between the physical layers, or bottom layer of the open system interface (OSI) model, at two different devices, such as a base station (Node B), mobile station (UE). The physical channel is directly transmitted over a communication media such as open air, optical fiber, etc. Currently in UMTS, there are three types of uplink dedicated physical channels employed for transmission of control information and data in the uplink: the uplink Dedicated Physical Data Channel (uplink DPDCH), the uplink Dedicated Physical Control Channel (uplink DPCCH), and the uplink Dedicated Control Channel associated with HS-DSCH transmission (uplink HS-DPCCH). These uplink dedicated physical channels are I/Q code multiplexed to provide a code multiplexed signal that is input to an amplifier for transmission on the uplink. With the development of EU-DCH services, however, new uplink dedicated physical channels, in addition to the existing physical channels, may have to be considered and/or developed to support proposed EU features.

For code multiplexing of these uplink physical channels, one concern is the potential for the peak-to-average power ratio (PAR) to increase. PAR is a ratio between the peak input power at a transmitter amplifier, such as a transmitter amplifier of a UE, for example, to the average input power to the amplifier. The peak power may be defied in terms of the average power of UEs having input power higher than a given threshold X % of the time, for example, where X is typically 99.9. PAR increases could present a significant problem for high speed data UEs utilizing both the HSDPA and EU-DCH services at the same time. In this case, the UE would be already code multiplexing the DPCCH, HS-DPCCH and potentially the DPDCH. Multiplexing additional physical channels that are needed for EU-DCH services, for example, could aggregate the PAR problem.

The effects of a PAR increase may be explained in reference to an input/output characteristic curve. An input/output characteristic curve for a given transmitter amplifier (of a mobile station or base station) is only linear within a certain region. To ensure there is no signal distortion, it is desirable to operate the amplifier within the linear region of the characteristic curve. Now, if PAR increases, this means the transmitted signal varies over a larger range. In this case, the operation point for the transmitter amplifier may have to moved lower on the characteristic curve, which reduces the output power generated by the transmitter. If no operational changes are made, PAR increases may cause the transmitter to suffer from distortion and hence, a reduction in efficiency. Thus, the cost of an amplifier may increase exponentially with the linearity of the amplifier. The wider linear range the amplifier can provide, the more costly the amplifier.

SUMMARY OF THE INVENTION

Exemplary embodiments of the present invention are directed to a method for aligning a plurality of physical channels for uplink transmission. Two or more physical channels may be aligned based on a timing offset, so that the two channels are transmitted in the uplink at a time instant different than a time of uplink transmission for a third physical channel. Accordingly, the two physical channels may be code multiplexed with additional physical channels other than the third physical channel to generate a code-multiplexed signal to be used for uplink transmission. The timing offset information may be assigned to the user from a base station, for example, in order to align the two physical channels. Accordingly, an increase in peak-to-average power ratio my be avoided and/or reduced when multiplexing the two physical channels with other physical channels for uplink transmission.

BRIEF DESCRIPTION OF THE DRAWINGS

Exemplary embodiments of the present invention will become more fully understood from the detailed description given herein below and the accompanying drawings, wherein like elements are represented by like reference numerals, which are given by way of illustration only and thus do not limit the exemplary embodiments of the present invention and wherein.

DETAILED DESCRIPTION OF EXEMPLARY EMBODIMENTS

Although the following description of the present invention is based on the Universal Mobile Telecommunications System (UMTS) network infrastructure implementing a next generation Wideband Code Division Multiple Access (W-CDMA) air interface technology, it should be noted that the exemplary embodiments shown and described herein are meant to be illustrative only and not limiting in any way. As such, various modifications will be apparent to those skilled in the art. For example, it will be understood that the present invention finds application to any medium access control protocol with multiple modes in other spread spectrum systems such as CDMA2000 systems.

Where used below, base transceiver station (BTS) and Node-B are synonymous and may describe equipment that provides data connectivity between a packet switched data network (PSDN) such as the Internet, and one or more mobile stations. Additionally where used below, the terms user, user equipment (UE), subscriber, mobile station and remote station are synonymous and describe a remote user of wireless resources in a wireless communication network.

In general, the exemplary embodiments of the present invention are directed to methods for aligning physical channels such as dedicated physical control channels (DPCCHs) and dedicated physical data channels (DPDCHs) for uplink transmission. The exemplary embodiments of the present invention provide a means to accommodate existing DPCCHs/DPDCHs, high speed channels such as uplink HS-DPCCHs that support HSPDA services, together with newly developed physical channels that may support EU-DCH services, so as to limit or avoid a potential peak-to-average power ratio (PAR) increase.

Accordingly, the exemplary embodiments introduce an uplink control channel for carrying control signal data in the uplink from a user, referred to as an Enhanced Uplink Dedicated Physical Control Channel (EU-DPCCH), and its associated data channel, the Enhanced Uplink Dedicated Physical Data Channel (EU-DPDCH). The EU-DPCCH and EU-DPDCH are envisioned for enhanced uplink (EU) features to support high-speed reverse link packet access in UMTS, although the exemplary embodiments are not limited to application to high-speed reverse link packet access in UMTS. Initially an exemplary wireless communication network architecture is described, as are general functions of dedicated uplink physical channels, so as to place the exemplary embodiments in context.

Figure 1:
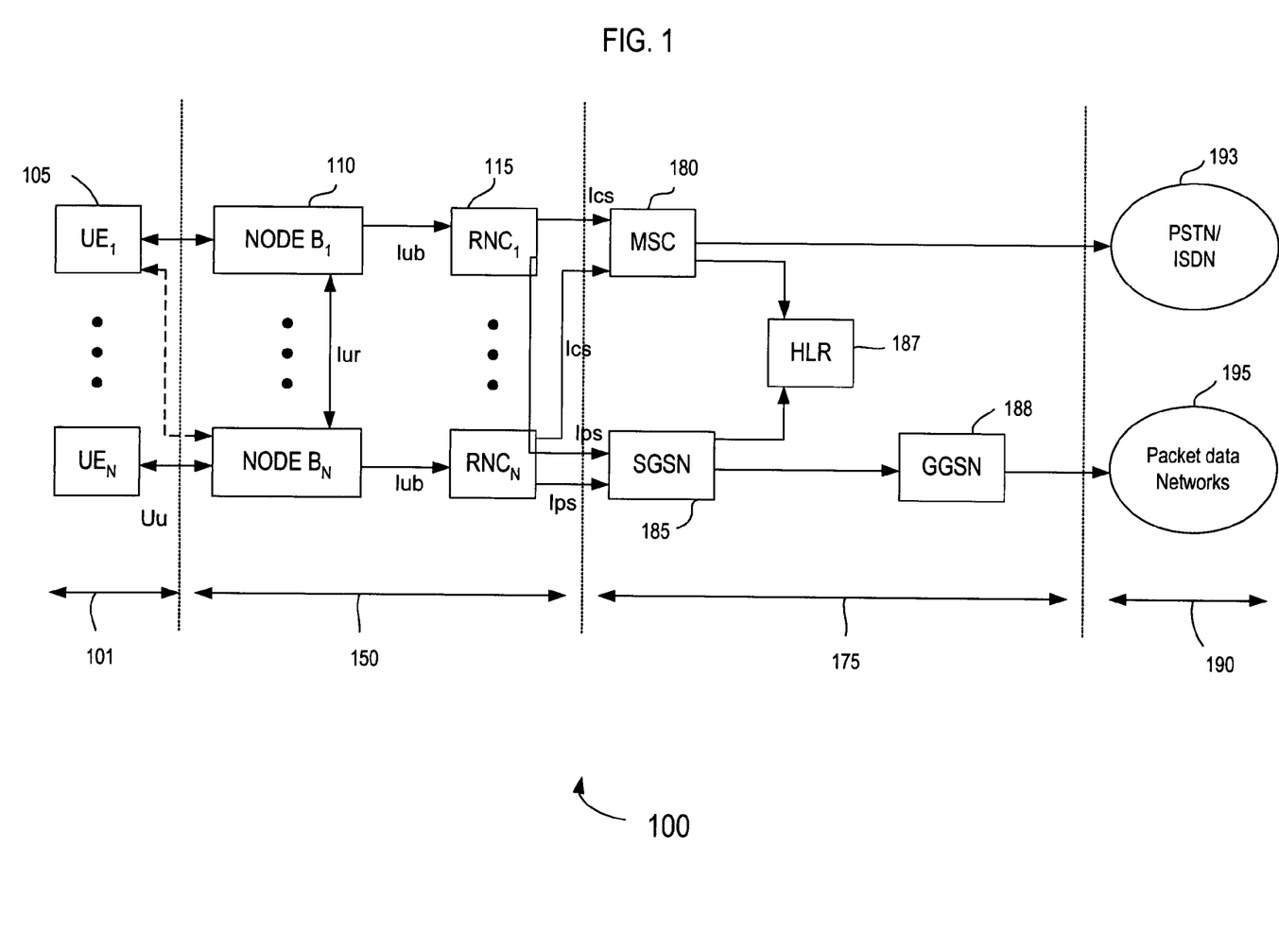
FIG. 1 illustrates a high-level diagram of the UMTS architecture, in accordance with an exemplary embodiment of the invention.

FIG. 1 illustrates a high-level diagram of the UMTS architecture, in accordance with an exemplary embodiment of the invention. This UMTS architecture is provided merely as an exemplary network or system architecture, it being understood that the physical channels proposed herein for enhanced uplink services could be applicable to other spread spectrum systems such as CDMA2000 systems.

Referring to FIG. 1, a UMTS architecture 100 comprises a radio access network- part that may be referred to as a UMTS terrestrial radio access network (UTRAN) 150. The UTRAN 150 interfaces over a Uu air interface with a radio interface part 101; namely user equipments (UEs) such as mobile stations. The Uu air interface is the radio interface between the UTRAN 150 and one or more UEs 105. The UTRAN 150 also interfaces with one or more core networks (CNs) 175 (only one being shown in FIG. 1 for simplicity) via interfaces Ics and Ips, for example. Ics, short for Interface Unit (Circuit Switched) interface, is the interface in UMTS which links the RNC with a Mobile Switching Center (MSC). Ips, short for Interface Unit (Packet Switched) interface, is the interface in UMTS which links the RNC with a Serving GPRS Support Node (SGSN). The Uu air interface enables interconnection of Node Bs with UEs, for example.

CN 175 may include mobile switching centers (MSCs) 180, SGSNs 185 and Gateway GPRS serving/support nodes (GGSNs) 188. SGSN 185 and GGSN 188 are gateways to external networks 190. In general in UMTS, SGSNs and GGSNs exchange packets with mobile stations over the UTRAN, and also exchange packets with other internet protocol (IP) networks, referred to herein as "packet data networks". External networks 190 may include various circuit networks 193 such as a packet Switched Telephone Network (PSTN) or Integrated Service Digital Network (ISDN) and packet data networks 195. UTRAN 150 may also be linked to the CN 175 via back-haul facilities (not shown) such as T1/E1, STM-x, etc., for example.

The UTRAN 150 may include cell sites, called Node Bs 110, which may serve a group of UEs 105, generally using a Uu interface protocol. A Node B 110 may contain radio transceivers that communicate using Iub protocol with radio network controllers (RNCs) 115 in UTRAN 150. RNCs 115 within UTRAN 150 may communicate with each other using an Iur protocol, for example. The Iur air interface is a subset of the Iu interface that enables interconnection of RNCs with each other. Several Node Bs 110 may interface with a single RNC 115 where, in additional to call setup and control activity, tasks such as radio resource management and frame selection in soft handoff may be carried out. Node Bs 110 and RNCs 115 may be connected via links that use ATM-based packet transport, for example.

Dedicated Physical Channels in the Uplink

The EU-DPCCH and EU-DPDCH are physical channels. In general, physical channels are defined by a specific carrier frequency, scrambling code, channelization code (optional), time start and stop (giving a duration) and, on the uplink, relative phase (0 or π/2). Time durations are defined by start and stop instants, measured in integer multiples of chips. Suitable multiples of chips include a radio frame, a slot (known also as a timeslot) and a sub-frame. A radio frame is a processing duration which consists of 15 slots. The length of a radio frame typically corresponds to 38400 chips. A slot is a duration which consists of fields containing bits. The length of a slot corresponds to 2560 chips. In general, a sub-frame is a basic time interval for a High Speed Downlink Shared Channel (HS-DSCH) transmission and HS-DSCH-related signaling at the physical layer (Layer 1). The HS-DSCH is a downlink transport channel shared by several UEs. The length of a sub-frame typically corresponds to 3 slots (7680 chips).

Existing Physical Channels

Figure 2A:
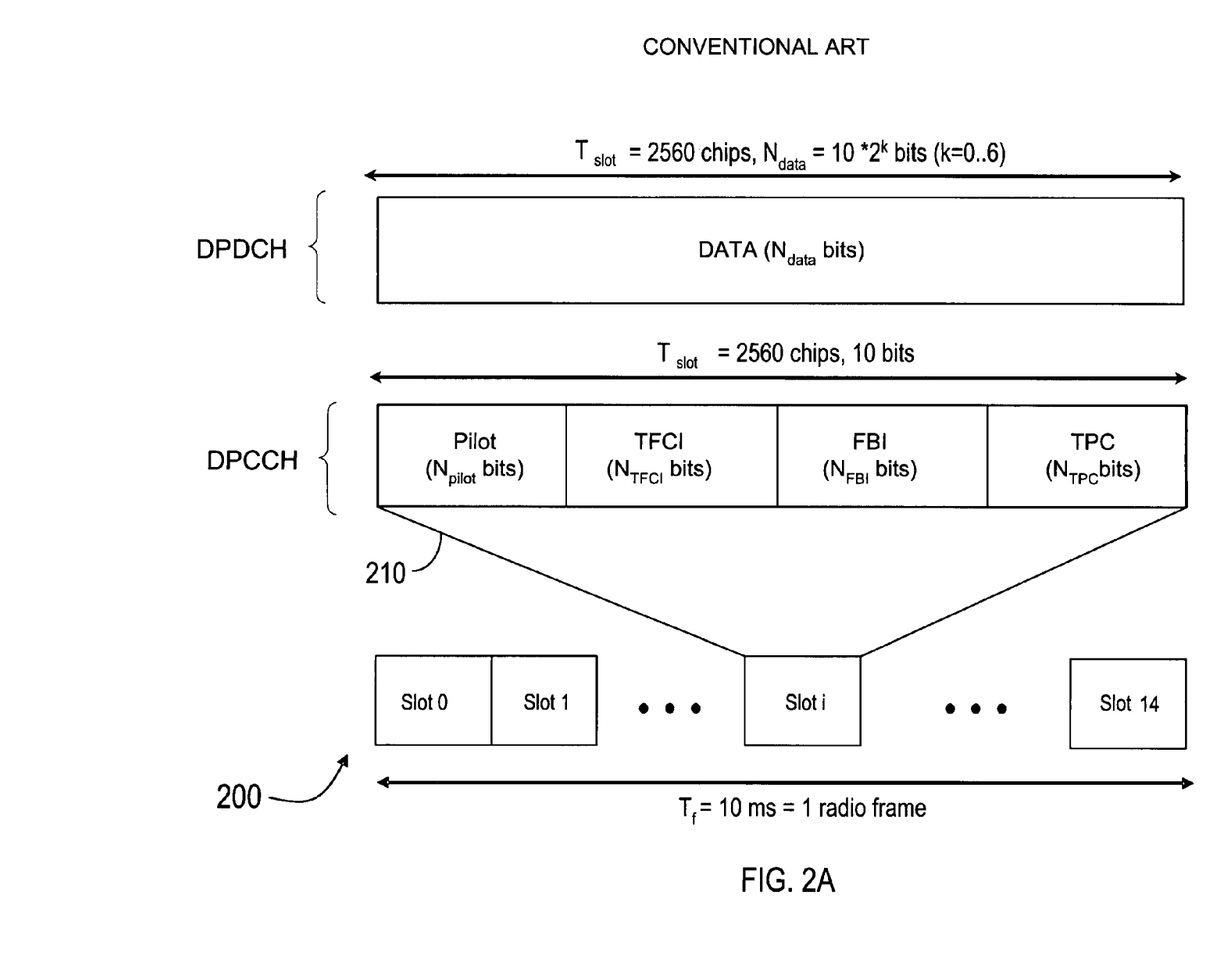
FIG. 2A illustrates the frame structure of a conventional uplink DPDCH and uplink DPCCH.

FIG. 2A illustrates the frame structure of a conventional uplink DPDCH and uplink DPCCH. This frame structure is described in detail in 3GPP TS 25.211 V5.3.0, entitled "3rd Generation Partnership Project; Technical Specification and Group Radio Access Network; physical channels and mapping of transport channels onto physical channels (FDD) (Release 5)", December 2002. Although this document has not been implemented in the standard, the frame structure provides a context for the following general discussion of dedicated physical channels.

Conventionally in UMTS, there are three types of uplink dedicated physical channels, the uplink Dedicated Physical Data Channel (uplink DPDCH), the uplink Dedicated Physical Control Channel (uplink DPCCH), and the uplink Dedicated Control Channel associated with HS-DSCH transmission (uplink HS-DPCCH). The DPDCH, the DPCCH and the HS-DPCCH are I/Q code multiplexed. The uplink DPDCH is used to carry the DCH transport channel (a transport channel of services offered by Layer 1 (physical layer) to the higher layers (OSI Layers 3-7). There may be zero, one, or several uplink DPDCHs on each radio link. As described in 3GPP TS 25.211 V5.3.0, transport channels are capable of being mapped to physical channels. Within the physical layer itself the exact mapping is from a composite coded transport channel (CCTrCH) to the data part of a physical channel. In other words, DCHs are coded and multiplexed and the resulting stream is mapped sequentially (first-in-first-mapped) via the CCTrCH directly to the physical channels (e.g., DPDCH, DPCCH).

The conventional uplink DPCCH is used to carry control information generated at Layer 1. The Layer 1 control information consists of known pilot bits to support channel estimation for coherent detection, transmit power-control (TPC) commands, feedback information (FBI), and an optional transport-format combination indicator (TFCI). The TFCI informs the receiver about the instantaneous transport format combination of the transport channels mapped to the simultaneously transmitted uplink DPDCH radio frame.

Referring now to FIG. 2A, Each radio frame 100 of length (Transmission Time Interval (TTI)) 10 ms is split into fifteen (15) slots 110, each of length $T_{slot}$=2560 chips, corresponding to one power-control period. There is one DPCCH on each radio link. The DPDCH and DPCCH are frame aligned with each other.

The parameter k in FIG. 2A determines the number of bits per uplink DPDCH slot, and is related to the spreading factor SF of the DPDCH as SF=256/$2^k$. The DPDCH spreading factor may range from 256 down to 4. The spreading factor of the uplink DPCCH is equal to 256, i.e. there are 10 bits per uplink DPCCH slot. The exact number of bits of the uplink DPDCH and the different uplink DPCCH fields ($N_{pilot}$, $N_{TFCI}$, $N_{FBI}$, and $N_{TPC}$) is specified in section 5.2 of 3GPP TS 25.211, V5.3.0. What slot format to use is configured by higher layers and can also be reconfigured by higher layers. As will be described in further detail below, multi-code operation is possible for the uplink dedicated physical channels. When multi-code transmission is used, several parallel DPDCHs are transmitted using different channelization codes. However, there is typically only one DPCCH per radio link.

Figure 2B:
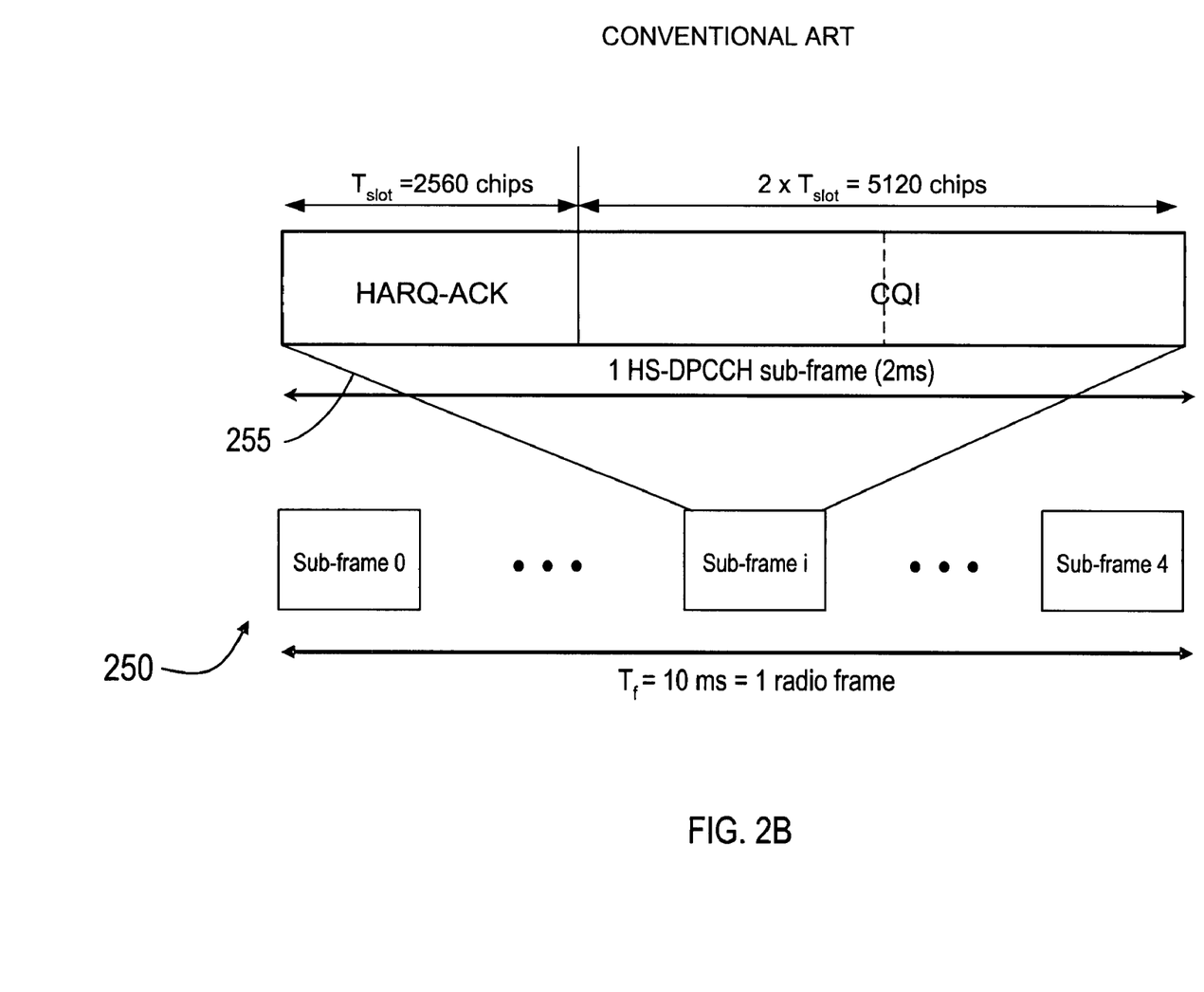
FIG. 2B illustrates the frame structure of a conventional uplink HS-DPCCH.

FIG. 2B illustrates the frame structure of a conventional HS-DPCCH. The HS-DPCCH carries uplink feedback signaling related to downlink HS-DSCH transmission. The HS-DSCH-related feedback signaling consists of Hybrid-ARQ Acknowledgement (HARQ-ACK) and Channel-Quality Indication (CQI). Each sub-frame 250 of length 2 ms (3*2560 chips) consists of three slots 255, each of length 2560 chips. The HARQ-ACK is carried in the first slot 255 of the HS-DPCCH sub-frame. The CQI is carried in the second and third slots 255 of sub-frame 250. There is at most one HS-DPCCH on each radio link. The HS-DPCCH may only exist together with an uplink DPCCH.

Proposed Uplink Dedicated Channels: EU-DPCCH and EU-DPDCH

Figure 3:
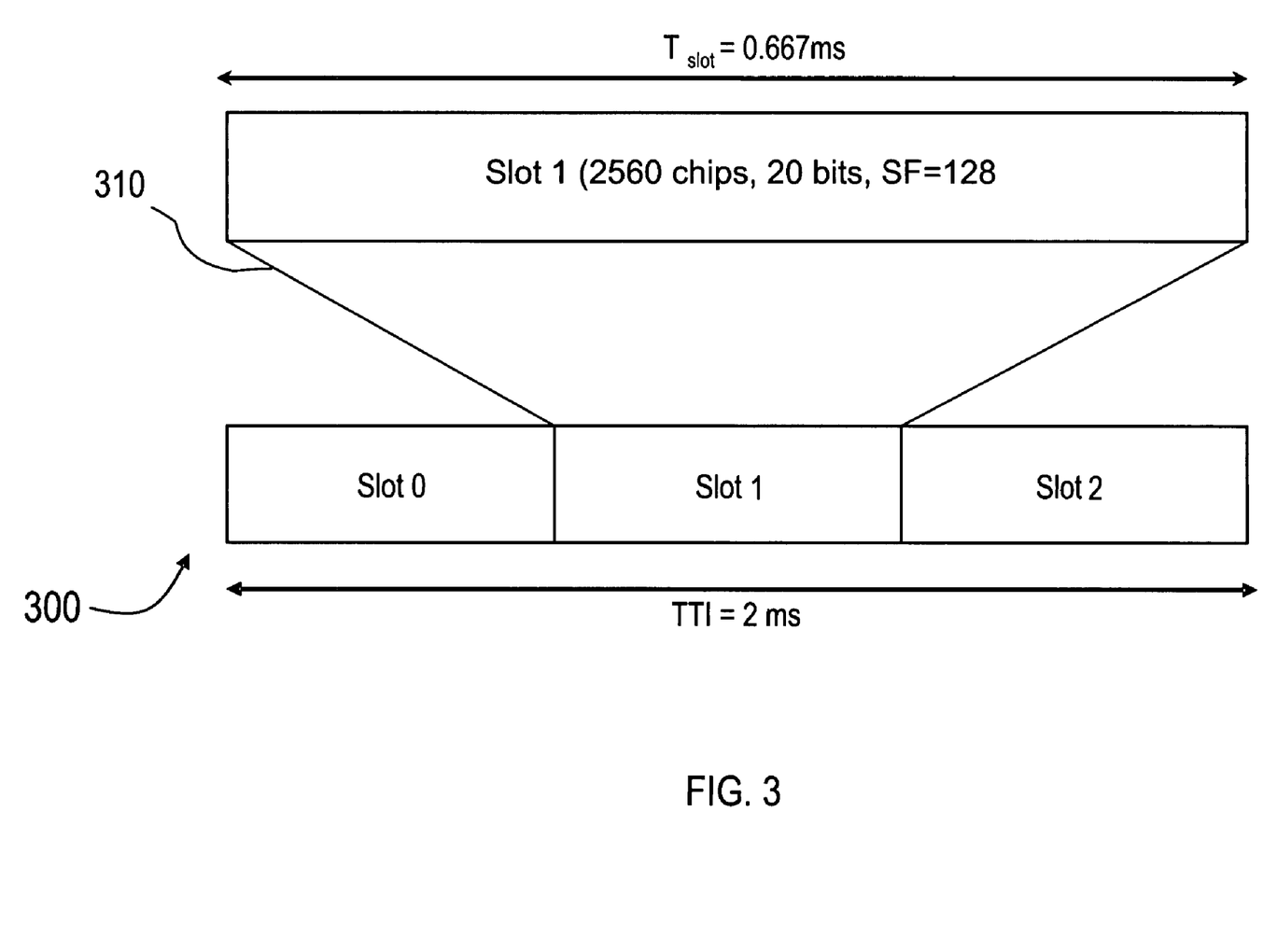
FIG. 3 illustrates an exemplary general structure of an EU-DPCCH sub-frame in accordance with the exemplary embodiments of the invention.

FIG. 3 illustrates an exemplary general structure of an EU-DPCCH sub-frame in accordance with the exemplary embodiments of the invention. The structure of the EU-DPDCH may be similar to the EU-DPCCH, thus a discussion of the EU-DPCCH is provided for reasons of brevity, it being understood that the sub-frame structure in FIG. 3 may also be applicable for the EU-DPDCH.

The EU-PDCCH is designed to support Enhanced Uplink (EU) features in UMTS and is associated with its uplink data channel, EU-DPDCH, to carry necessary control information on the uplink. Although not a focus in the present invention, and as described in detail in co-pending application Ser. No. 10/647,339 (hereafter "'339 application") to the inventor, the EU-DPCCH may be used to send control signaling information for packet data (such as high speed data) on the uplink when a UE is configured in both a scheduled transmission mode and a rate-controlled transmission mode. These modes are described briefly below, as these modes are described in greater detail in the '339 application.

Referring to FIG. 3, a sub-frame 300 of an EU-DPCCH (or EU-DPDCH) is illustrated. The sub-frame 300 is shown having a fixed transmission time interval (TTI) of 2 ms, it being understood that 2 ms is an exemplary TTI. Other fixed TTI lengths may be applicable, such as 3.3 ms, 4 ms, 6 ms and 8 ms, or a variable TTI length, depending on the desired implementation. Accordingly, the TTI length may be adapted for a desired channel design.

Each sub-frame 300 may include three slots 310 (Slot 0, Slot 1 and Slot 2), each of a duration ($T_{slot}$) 0.667 ms each ($T_{slot}$=2560 chips=0.667 ms, 2*10*k bits (k=256/SF)). Although not shown, information, which may be control signaling information or data such as packet data in each slot 210 may be transmitted over multiple channelization code slots. The EU-DPCCH (or EU-DPDCH) may use a channelization code of spreading factor (SF) 128. With BPSK modulation, the 2 ms TTI and fixed SF=128, up to 60 coded bits may be transmitted per sub-frame 300. Each slot 310 may include a specified field format, depending on what transmissions mode the UE 105 is in for scheduling transmission of packet data and/or high speed data in the uplink to the Node B 110. Regardless of the TTI chosen, the number of fields that are specified in a particular slot 310 of the sub-frame 300 may remain constant.

The EU-DPCCH may be configured for a UE operating in different transmission modes. Exemplary sub-frame structure and data fields of a EU-DPCCH in the case where a UE 105 is in a scheduled transmission mode, rate-controlled transmission mode and reporting mode is described in detail in co-pending '339 application; thus a detailed description is omitted for purposes of brevity. Accordingly, an EU-DPCCH may signal control information in the uplink to the Node B 110, regardless what transmission mode the UE 105 is in for scheduling of uplink transmissions, thus, the slots 310 of the EU-DPCCH (or EU-DPDCH) sub-frame 300 may have different field formats, as described in the co-pending '339 application.

Multiplexing of Uplink Dedicated Physical Channels

Figure 4:
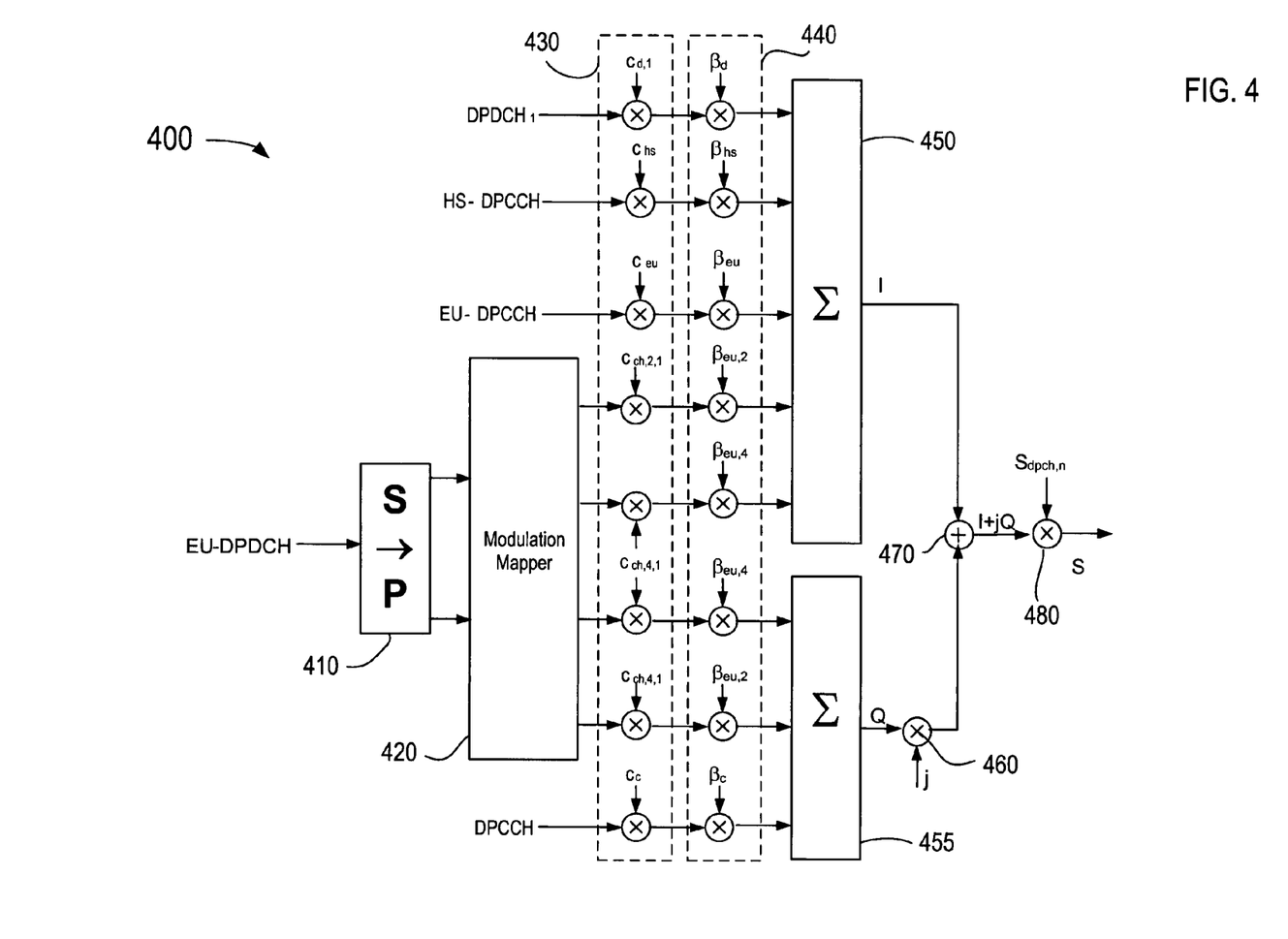
FIG. 4 illustrates spreading for uplink dedicated physical channels in accordance with the exemplary embodiments of the invention.

FIG. 4 illustrates spreading for uplink dedicated physical channels in accordance with the exemplary embodiments of the invention. The proposed channels for supporting EU-DCH services having been briefly described, an exemplary method of spreading, or multiplexing the proposed EU channels with existing HS-DPCCH and DPDCH/DPCCHs may be explained with reference to FIG. 4.

The diagram in FIG. 4 provides the basis for multiplexing of physical channels in the uplink, as described in the co-pending application to the inventor entitled ""Multiplexing of Physical Channels on the Uplink". Accordingly, FIG. 4 is provided to show the spreading or multiplexing in the uplink that may be required for multiplexing the proposed uplink channels EU-DPDCH and EU-DPCCH with existing DPDCHs/DPCCHs and/or a HS-DPCCH.

In general, spreading is applied to the physical channels. Spreading may consist of two operations: channelization and scrambling. A channelization operation transforms every data symbol from each physical channel into a number of chips, thus increasing the bandwidth of the signal. The number of chips per data symbol may be called the Spreading Factor (SF). The second operation is the scrambling operation, where a scrambling code is applied to the spread signal. With the channelization, data symbols on so-called I- and Q-branches may be independently multiplied with an Orthogonal Variable Spreading Factor (OVSF) code. With a scrambling operation, resultant spread signals on the I- and Q-branches may be further multiplied by a complex-valued scrambling code, where I and Q denote real and imaginary parts, respectively.

Referring now to FIG. 4, the principle of uplink spreading of DPCCHs, DPDCHs, HS-DPCCHs, EU-DPCCH and EU-DPDCHs, shown generally by arrow 400 may be described. The binary DPCCH (which carries control information for its corresponding DPDCHs), DPDCH (which may carry voice or data related to release 99 services, for example), HS-DPCCH (carrying control information for downlink high speed data) and EU-DPCCH (carrying control information for its corresponding EU-DPDCHs) to be spread may be represented by real-valued sequences, i.e. the binary value "0" is mapped to the real value +1, the binary value "1" is mapped to the real value −1, and the value "DTX" (HS-DPCCH only) is mapped to the real value 0. The DPCCH may be spread to the chip rate by the channelization code $c_c$. The n:th DPDCH, referred to as $DPDCH_n$ may be spread to the chip rate by the channelization code $c_{d,n}$. The HS-DPCCH may be spread to the chip rate by the channelization code $c_{hs}$. The EU-DPCCH may be spread to the chip rate by the channelization code $c_{eu}$. Exemplary code allocations (e.g., codes used to spread the channel) for DPCCH, DPDCH and HS-DPCCH may be as described in Section 4.3.1.2 of 3GPP TS 25.213, V.5.3.0 (2003-03) entitled "Spreading and modulation" (FDD)(Release 5), for example. Exemplary code allocations for the EU-DPCCH may be similar to those described in TS 25.213 for the DPCCH and those for the EU-DPCCH similar to that described for the DPDCH in TS 25.213.

The EU-DPDCH may carry information consisting of complex-valued data symbols, data symbols that may have both real and imaginary parts. Additionally, the EU-DPDCH may be configured to support higher order modulation (such as QPSK, 16QAM, 64QAM, APSK, etc.) than modulation supported by the existing physical channels. Accordingly, if information on the EU-DPDCH is to be multiplexed with information on the other physical channels, the information, e.g., data symbols, are first serial-to-parallel converted at Serial-to-Parallel converter 410 and then mapped to one or more of an I branch or Q branch via modulation mapper 420. If an EU-DPDCH exists, then both the HS-DPCCH and EU-DPCCH should be mapped to the same branch (I or Q).

In case of QPSK, each pair of two consecutive real-valued symbols on the EU-DPDCH may be first serial-to-parallel converted at 410 and mapped at 420 to an I and Q branch. The definition of the modulation mapper 420 may vary depending on the modulation. For complex-valued modulations such as PSK, QAM, etc, the general rule is such that x number of bits are mapped to the I-branch with a given amplitude and phase, while the next x number of bits are mapped to the Q-branch in a similar fashion. In the case of QPSK, even and odd numbered symbols are mapped to the I and Q branch respectively. The I and Q branches are then both spread to the chip rate by the same real-valued channelization code $C_{ch,SF,m}$, where ch is the channel, SF is the spreading factor and m is the index to all valid channelization codes with the given spread factor, SF., shown as $C_{ch,2,1}$ and $C_{ch,4,1}$ in dotted block 430 of FIG. 4. The channelization code sequence should be aligned in time with the symbol boundary. In the case of 16QAM, a set of consecutive binary symbols may serial-to-parallel converted at 410 and then mapped to 16QAM by the modulation mapper 420. The I and Q branches may then both spread to the chip rate by the same real-valued channelization code $C_{ch,16,m}$ (not shown). As described for QPSK, the channelization code sequence for 16QAM should be aligned in time with the symbol boundary.

In FIG. 4, one DPCCH, up to six parallel DPDCHs, and one HS-DPCCH can be transmitted simultaneously, i.e. $1 \leq n \leq 6$. If an EU-DPCCH is being transmitted in lieu of a DPCCH, one HS-DPCCH and up to n EU-DPDCHs may be transmitted simultaneously. As an example, two complex-valued EU-DPDCHs can be formed, each having different channelization codes. One EU-DPDCH can be QPSK modulated using SF=2, e.g., $C_{ch,2,1}$ while the other EU-DPDCH can be 16QAM modulated using SF=4, e.g., $C_{ch,4,1}$. Both the I and Q branches for the same EU-DPDCH may be spread using the same real-valued channelization code. In another exemplary three complex-valued EU-DPDCHs could use the same spreading factor, e.g., SF=4; the same modulation, e.g., QPSK; but each EU-DPDCH could be spread by different channelization codes.

Thus, for each of the physical channels, real-valued and/or imaginary-valued spread signals are generated from the channel information due to channelization at block 430. After channelization, the real-valued (and imaginary-valued) spread signals may be weighted at block 440 by gain factors, $\beta_c$ for DPCCH, $\beta_d$ for all DPDCHs, $\beta_{hs}$ for HS-DPCCH (if one is active), $\beta_{eu}$ for EU-DPCCH (if one is active), and $\beta_{eu}$, SF for all EU-DPDCHs. The $\beta_c$ and $\beta_d$ values may be signaled by higher layers or calculated as described in Section 5.1.2.5 of 3GPP TS 25.214, entitled Physical Layer Procedures (FDD), for example. At every instant in time, at least one of the values $\beta_c$ and $\beta_d$ may have the amplitude 1.0. The $\beta_c$ and $\beta_d$ values may be quantized into 4 bit words, and have quantization steps as shown in Table 1.

TABLE 1

The quantization of the gain parameters

| Signalling values for $\beta_c$ and $\beta_d$ | Quantized amplitude ratios $\beta_c$ and $\beta_d$ |
|---|---|
| 15 | 1.0 |
| 14 | 14/15 |
| 13 | 13/15 |
| 12 | 12/15 |
| 11 | 11/15 |
| 10 | 10/15 |
| 9 | 9/15 |
| 8 | 8/15 |
| 7 | 7/15 |
| 6 | 6/15 |
| 5 | 5/15 |
| 4 | 4/15 |
| 3 | 3/15 |
| 2 | 2/15 |
| 1 | 1/15 |
| 0 | Switch off |

Similar to $\beta_c$ and $\beta_d$ values of Table 1, at every instant in time, at least one of the values $\beta_{eu}$ may have an amplitude 1.0 and may be quantized into a 4 bit word. Accordingly, the values in Table 1 are equally applicable to $\beta_{eu}$. In the case of multiple EU-DPDCHs, each EU-DPDCH has a $\beta_{eu}$ which can be different.

The $\beta_{hs}$ value may be derived from a power offset $\Delta_{ACK}$, $\Delta_{NACK}$ and $\Delta_{CQI}$, which are signaled by higher layers as described in Section 5.1.2.6 of 3GPP TS 25.214. The relative power offsets $\Delta_{ACK}$, $\Delta_{NACK}$ and $\Delta_{CQI}$ are quantized into amplitude ratios as shown in Table 2.

TABLE 2

The quantization of the power offset

| Signalling values for $\Delta_{ACK}$, $\Delta_{NACK}$ and $\Delta_{CQI}$ | Quantized amplitude ratio for $10^{\left(\frac{\Delta_{HS-DPCCH}}{20}\right)}$ |
|---|---|
| 8 | 30/15 |
| 7 | 24/15 |
| 6 | 19/15 |
| 5 | 15/15 |
| 4 | 12/15 |
| 3 | 9/15 |
| 2 | 8/15 |
| 1 | 6/15 |
| 0 | 5/15 |

After the weighting at block 440, the signal streams of real-valued chips on the I-branch are summed at 450 and the streams of imaginary-valued chips on the Q-branch are summed at 455. The summed signal output at 455 is subject to phase rotation at 460. The signal streams output of summer 450 and at 460 are then summed and treated as a complex-valued signal or stream of chips (I+jQ) at adder 470.

This complex-valued signal may be scrambled by a complex-valued scrambling code, denoted as $S_{dpch,n}$, at multiplier 480 in order to generate the code-multiplexed signal S that is used for uplink transmission. The scrambling code may be applied so as to be aligned with the radio frames, i.e. the first scrambling chip corresponds to the beginning of a radio frame. The code used for scrambling of the uplink physical channels may be of either long or short type. When the scrambling code is formed, different constituent codes may be used for the long and short type, such as is defined in Section 4.3.2.4 of TS 25.213, for example. The code-multiplexed signal S is then sent into an RF module of the UE 105 and modulated into IF and RF frequency, then transmitted over the air.

Figure 5:
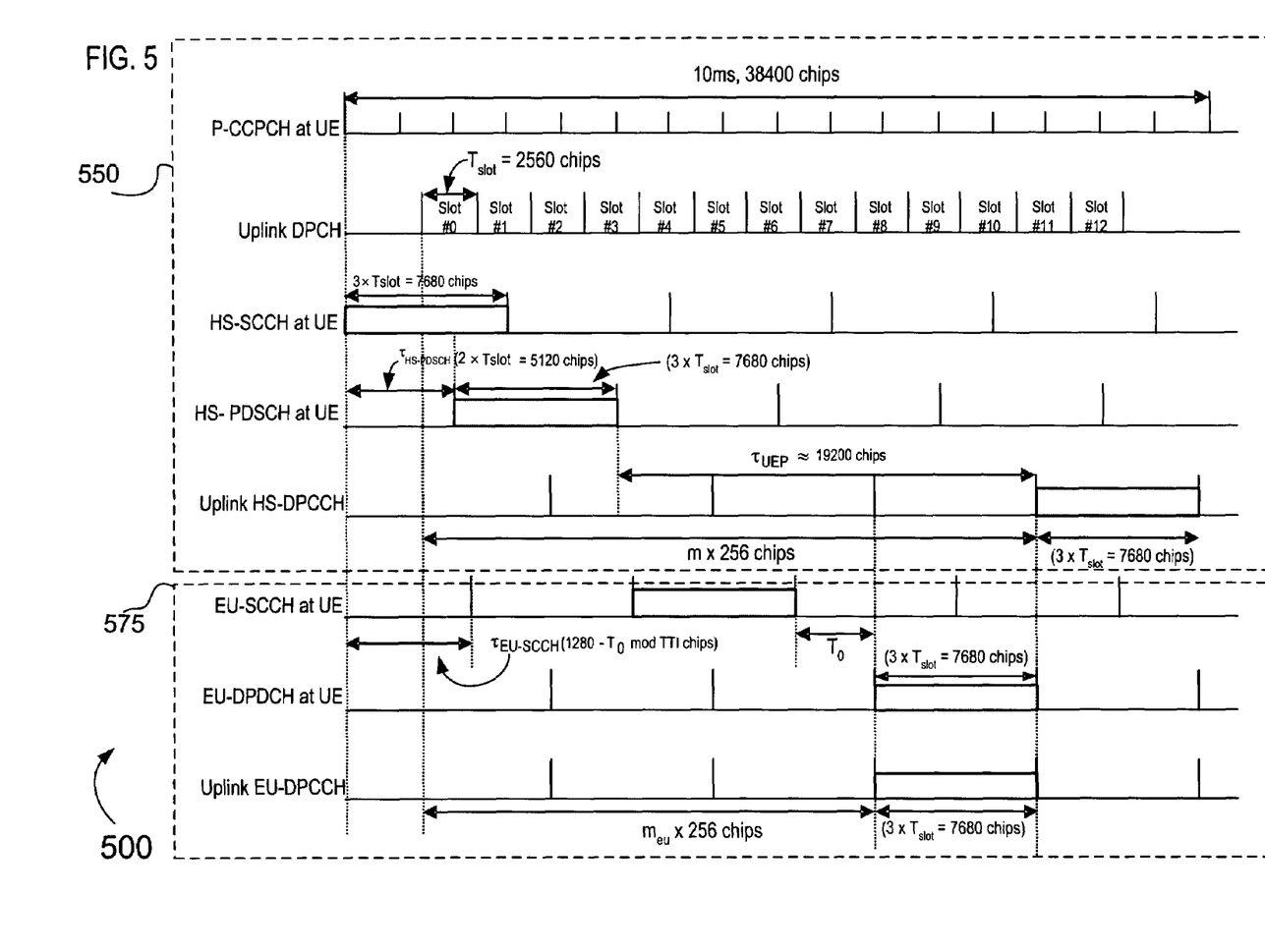
FIG. 5 is a timing diagram illustrating a method of aligning physical channels for uplink transmission in accordance with an exemplary embodiment of the present invention

FIG. 5 is a timing diagram illustrating a method of aligning physical channels for uplink transmission in accordance with an exemplary embodiment of the present invention. An understanding of the uplink physical channels and of the multiplexing of physical channels having been described, timing diagram 500 is provided to illustrate how the EU-DPDCH and EU-DPCCH may be aligned for uplink transmission so as to limit or reduce the potential for a PAR increase due to the multiplexing of the additional EU-DPDCH and EU-DPCCH with other physical channels, such as is shown in FIG. 4, for example.

A UE 105 configured for UMTS Release 5 and UEs backward compatible with Release 4 and Release 99 specifications, are supposed to be capable of simultaneously multiplexing DPCCH, DPDCHs, as well as an occasional HS-DPCCH (UMTS currently has three official releases: Release 99, Release 4 and Release 5 specifications. Release 5 is the most recent release. The 3GPP is currently working on Release 6 specifications). While the UE 105 should be able to support multi-code transmission up to six (6) DPDCHs at a fixed spreading of four (SF=4), most of the Release 99/4/5-compatible UEs 105 that are entering the marketplace will not be able to do that, primarily due to the high cost encountered to manufacture multi-code UEs, and the lack of demand from the service provider. It is foreseeable that multiplexing extra physical channels such as the EU-DPCCH and EU-DPDCH could potentially lead to a substantial increase in the cost of the UE 105. Accordingly, the timing relationships shown in timing diagram 500 of FIG. 5 are referred to hereafter to describe aligning of certain physical channels, such as the EU-DPCCH and EU-DPDCH, so as to avoid PAR increases, in an effort to reduce cost.

General timing relationships between physical channels in the Frequency Division Duplex (FDD) mode of UMTS terrestrial radio access are described in Section 7 of 3GPP TS 25.211, V5.4.0., entitled "Physical channels and Mapping of Transport Channels onto Physical Channels (FDD)(Release 5), June 2003. FIG. 5 illustrates some of these timing relationships seen by the UE 105. The top portion of FIG. 5 (in the dotted line box labeled 550) shows the existing timing offset between the uplink Dedicated Physical Channel (DPCH), the High Speed Physical Downlink Shared Channel (HS-PDSCH), the HS-DPCCH, the downlink High Speed Shared Control Channel (HS-SCCH) seen at the UE 105 and the Primary Common Control Physical Channel (P-CCPCH).

The uplink DPCH represents the DPDCH+DPCCH, since the DPDCH and DPCCH have the same timing on the uplink. The HS-PDSCH is used to carry the Downlink Shared Channel (DSCH). In general a PDSCH corresponds to a channelization code below or at a PDSCH root channelization code. A PDSCH such as a HS-PDSCH is allocated on a radio frame basis to a single UE. Within one radio frame, UTRAN 150 may allocate different PDSCHs under the same PDSCH root channelization code to different UEs 105 based on code multiplexing. Within the same radio frame, multiple parallel PDSCHs, with the same spreading factor, may be allocated to a single UE 105. This is a special case of multicode transmission. All PDSCHs are operated with radio frame synchronization.

HS-SCCHs are used for transmitting signaling information that is needed for the UE 105 to process the corresponding data transmission. By way of example, signaling information in the HS-SCCHs can include transmission format information such as code information (which codes are used for the data transmission), modulation information, Transport Block Size (TBS), etc. The HS-SCCHs are used on a shared basis among all the UEs 105 such that all the UEs 105 would read all the HS-SCCHs configured in a cell of a wireless network.

The P-CCPCH, on which the cell System Frame Number (SFN—in general the system frame number is a frame number of a numbering system used by the wireless communication system to label each frame) is transmitted, is used as timing reference for all the physical channels, directly for downlink and indirectly for uplink. These timing relationships in dotted line box 550 are specified in Section 7 of TS 25.211, thus a detailed explanation of the timing relationships between these channels is omitted for the sake of brevity, as the focus of the method of aligning is directed to aligning the EU-DPDCH, EU-DPCCH with the HS-DPCCH in dotted line box 550.

As previously shown in FIG. 4, it is possible that the EU-DPDCH and EU-DPCCH may be code multiplexed together with the DPDCH and DPCCH/HS-DPCCH. Accordingly, in an effort to reduce the rise in PAR, and hence cost of the UE 105, the number of physical channels that are to be simultaneously multiplexed is minimized to the extent possible.

Referring now to FIG. 5, an uplink HS-DPCCH sub-frame starts m*256 chips (m being a selectable parameter defined in TS 25.211, Section 7.7, for example) after the start of an uplink DPCH frame that corresponds to a downlink DPCH frame (not shown) from the High Speed Dedicated Shared Channel (HS-DSCH) serving cell (not shown) containing the beginning of the associated HS-PDSCH subframe. Also in FIG. 5, the start of the HS-SCCH subframe #0 is aligned with the start of the P-CCPCH frames.

As a step towards avoiding an increase in PAR, or reducing the PAR, subframe boundaries of the EU-DPDCH and EU-DPDCH may be lined up (aligned) with the HS-DPCCH subframe boundary, as shown by arrows 580 in FIG. 5. This may be accomplished by aligning an Enhanced Uplink Shared Control Channel (EU-SCCH, which is analogous to the downlink HS-SCCH for HSPDA, but used for carrying control signaling in the downlink for EU-DCH services) based on a timing offset. Accordingly, the EU-DPCCH and EU-DPDCH may be multiplexed with other physical channels (e.g., DPDCHs, a DPCCH), as shown in FIG. 4 for example, to generate a code multiplexed signal for uplink transmission. Moreover, aligning the physical channels in this way is designed to prevent simultaneous multiplexing (and hence transmission) of both an EU-DPCCH and a HS-DPCCH with other physical channels.

For example, in lower dotted box 575, there is shown timing relations between various proposed physical channels. The timing offset $T_0$ represents a processing time (in chips) required at the UE 105 to decode the EU-SCCH subframe received in the downlink. The EU-DPDCH and the EU-DPCCH may be code multiplexed to transmit during the same sub-frame if the start of the EU-SCCH subframe #0 is aligned with the 8960-$T_0$'s chip of the P-CCPCH frame. The 8960-$T_0$ chip is one subframe duration (a TTI or 3 timeslots=7680 chips) from a timing offset $\tau_{EU-SCCH}$ between the EU-SCCH and the P-CCPCH. When the EU-SCCH is aligned (due to the timing offset $\tau_{EU-SCCH}$) to the P-CCPCH as shown in FIG. 5, the EU-DPDCH and EU-DPCCH subframe boundaries are aligned (or synchronized in time) with each other, and aligned to the boundary of the HS-DPCCH subframe so as not to overlap. In other words, the EU-DPDCH/EU-DPCCH and HS-DPCCH will be aligned so as to have the same sub-frame boundaries. A UE 105 in rate-controlled mode, when transmitting EU-DPCCH/EU-DPDCH, can choose to transmit either EU-DPDCH/EU-DPCCH or HS-DPCCH and not transmitting both at the same time. For a UE 105 in scheduled mode, an uplink EU-scheduler in the serving Node B 110 can also easily schedule the UE 105 to consciously avoid the HS-DPCCH transmissions, given that the serving Node B 110 for the UE 105 in the uplink should also be the serving Node B 110 for the same UE 105 on the downlink (HSDPA).

Accordingly, synchronizing the subframe boundaries of HS-DPCCH, EU-DPCCH and EU-DPDCH as described above may be an effective way of avoiding PAR increases and/or reducing the PAR when multiplexing additional physical channels that support different services, such as EU-DCH services, for example.

To align subframe #0 of an EU-SCCH with the start of subframes of the P-CCPCH as shown in FIG. 5, the Node B 110 may initiate the timing offset $\tau_{EU-SCCH}$ between the EU-SCCH and the P-CCPCH. When a channel is first initialized, it is given a specific timing relationship to start with. As described, all timings are related to P-CCPCH timing. These timings are either pre-defined, or are specified by the RNC 115. In the present case, the EU-SCCH also has to be given a initial timing; this may be done by the Node B 110, the Node B 110 will start the channel with the given timing. Since EU-SCCH is a shared control channel, there is no dedicated procedure between the Node B 110 and a specific UE 105 to do handshaking. Accordingly, the Node B 110 initiates an EU-SCCH timing offset of [(1280-$T_0$ mod TTI) chips from the start of the P-CCPCH frame boundary, where the TTI is equal to 3 time slots or 7680 (2560*3) chips. This timing offset for the EU-SCCH, relative to the P-CCPCH seen at the UE 105, may be followed whether there is HSDPA on the downlink or not, so as to limit the number of physical channels that are multiplexed for simultaneous transmission on the uplink.

Another reason for lining up the uplink transmission between HSDPA services (e.g., HS-DPCCH) and EU-DCH services (e.g., EU-DPCCH/DPDCH) is for scheduling purposes at the Node B 110. The Node B 110 should be fully aware of the timing of the HS-DPCCH for any given UE 105, in order to schedule around any HS-DPCCH transmission. That is, in any given TTI, either a HS-DPCCH or a EU-DPCCH, but not both control channels, is to be multiplexed with other physical channels for uplink transmission. The method of aligning these channels thus may ensure that the EU-DPCCH, EU-DPDCH and HS-DPCCH are not transmitted at the same time instant, potentially wasting system resources, leading to an increase in PAR and placing unnecessary interference on the airlink. The HS-DPCCH and EU-DPCCH could use the same OVSF code; however, this is not necessary since the uplink transmission is interference limited instead of code limited. A interference limited system means that the capacity of the system may be limited by the amount of the interference in the system. Similarly, a code limited system is a system that may be limited due to capacity bottleneck caused by the available (or lack thereof) channelization codes. Usually, in CDMA systems, the downlink is code limited since different channelization codes are assigned to different users. Hence users may be separated by their channelization codes. On the uplink, the users may be separated by the scrambling code. Each user has a full set of channelization codes at its disposal. These limitations may arise due to the way the wireless communication system is designed, for example.

The exemplary embodiments of the present invention being thus described, it will be obvious that the same may be varied in many ways. For example, the method and/or system described herein may be implemented at different locations, such as the wireless unit, the base station, a base station controller and/or mobile switching center, and employed in conjunction with various multiple access schemes, such as CDMA and orthogonal frequency division multiple access OFDMA, for example. Such variations are not to be regarded as departure from the spirit and scope of the exemplary embodiments of the present invention, and all such modifications as would be obvious to one skilled in the art are intended to be included within the scope of the following claims.

What is claimed is:

1. A method of aligning a plurality of physical channels, comprising:

aligning first and second uplink physical channels based on a timing offset that aligns subframes of a shared control channel (SCCH) with a start of a plurality of subframes of a common control channel that is used as a timing reference for all physical channels received in the downlink or physical channels to be transmitted in the uplink, the timing offset representing a processing time required at a user equipment to decode a subframe of the shared control channel; and transmitting said first and second channels over an uplink at a time instant different than that of a third uplink physical channel, such that none of subframes of said first and second channels transmitted in the uplink overlap with uplink transmission of a subframe of said third channel, said first and second channels including a control channel and a data channel, said timing offset preventing said control channel from being transmitted in the uplink at a same time as said third channel.

2. The method of claim 1, wherein said aligning step further includes synchronizing subframe boundaries of said subframes of said first and second uplink physical channels so that said subframes are transmitted in the uplink at a same time instant.

3. The method of claim 1, wherein
the control channel is configured to support enhanced uplink (EU) services and the data channel is configured to support enhanced uplink (EU) services, and said third physical channel is an uplink control channel configured to support high speed downlink packet access (HSPDA) services.

4. The method of claim 1, wherein the SCCH is configured to provide control signaling in the downlink to support enhanced uplink (EU) services.

5. A method of multiplexing a plurality of physical channels for uplink transmission, comprising:

aligning first and second physical channels based on a timing offset that aligns subframes of a shared control channel (SCCH) with a start of a plurality of subframes of a common control channel that is used as a timing reference for all physical channels received in the downlink or physical channels to be transmitted in the uplink, the timing offset representing a processing time required at a user equipment to decode a subframe of the shared control channel;

transmitting said first and second channels in the uplink at a time instant different than a time of uplink transmission for a third physical channel, such that none of subframes of said first and second channels transmitted in the uplink overlap with uplink transmission of a subframe of said third channel; and code multiplexing said first and second physical channels with additional physical channels other than said third physical channel at said different time instant to generate a code-multiplexed signal to be used for uplink transmission, said first and second channels including a control channel and a data channel, said timing offset preventing said control channel from being transmitted in the uplink at a same time as said third channel.

6. The method of claim 5, wherein said aligning step includes synchronizing subframe boundaries of subframes of said first and second uplink physical channels so that said subframes are transmitted in the uplink at the same time instant.

7. The method of claim 5, wherein
the control channel is configured to support enhanced uplink (EU) services and the data channel is configured to support enhanced uplink (EU) services, and said third physical channel is an uplink control channel configured to support high speed downlink packet access (HSPDA) services.

8. The method of claim 5, wherein the SCCH is configured to provide control signaling in the downlink to support enhanced uplink (EU) services.

9. A method for scheduling transmission of a plurality of physical channels in the uplink, comprising:

assigning timing offset information to a user for aligning first and second uplink physical channels that aligns subframes of a shared control channel (SCCH) with a start of a plurality of subframes of a common control channel that is used as a timing reference for all physical channels received in the downlink or physical channels to be transmitted in the uplink, the timing offset representing a processing time required at a user equipment to decode a subframe of the shared control channel; and transmitting said first and second channels in the uplink at a time instant different than a time of uplink transmission for a third uplink physical channel, such that none of subframes of said first and second channels transmitted in the uplink overlap with uplink transmission of a subframe of said third channel, said first and second channels including a control channel and a data channel, said timing offset preventing said control channel from being transmitted in the uplink at a same time as said third channel.

10. The method of claim 9, wherein
the control channel is configured to support enhanced uplink (EU) services and the data channel is configured to support enhanced uplink (EU) services, and said third physical channel is an uplink control channel configured to support high speed downlink packet access (HSPDA) services.

11. The method of claim 9, wherein the SCCH is configured to provide control signaling in the downlink to support enhanced uplink (EU) services.

12. A method of avoiding an increase in peak-to-average power ratio if multiplexing a plurality of physical channels for uplink transmission, comprising:

aligning first and second physical channels based on a timing offset that aligns subframes of a shared control channel (SCCH) with a start of a plurality of subframes of a common control channel that is used as a timing reference for all physical channels received in the downlink or physical channels to be transmitted in the uplink, the timing offset representing a processing time required at a user equipment to decode a subframe of the shared control channel;

multiplexing said first and second channels; and transmitting said first and second channels in the uplink at a time instant different than a time of uplink transmission for a third physical channel, such that none of subframes of said first and second channels transmitted in the uplink overlap with uplink transmission of a subframe of said third channel, said first and second channels including a control channel and a data channel, said timing offset preventing said control channel from being transmitted in the uplink at a same time as said third channel.

* * * * *